Dec. 19, 1939.   J. F. LEVAN   2,183,774
OPERATING MECHANISM FOR WINDSHIELDS AND THE LIKE
Filed May 5, 1937   3 Sheets-Sheet 1
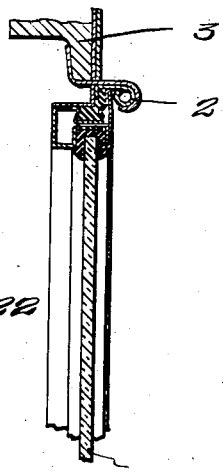
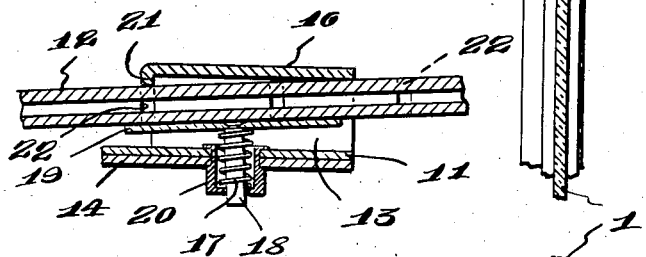
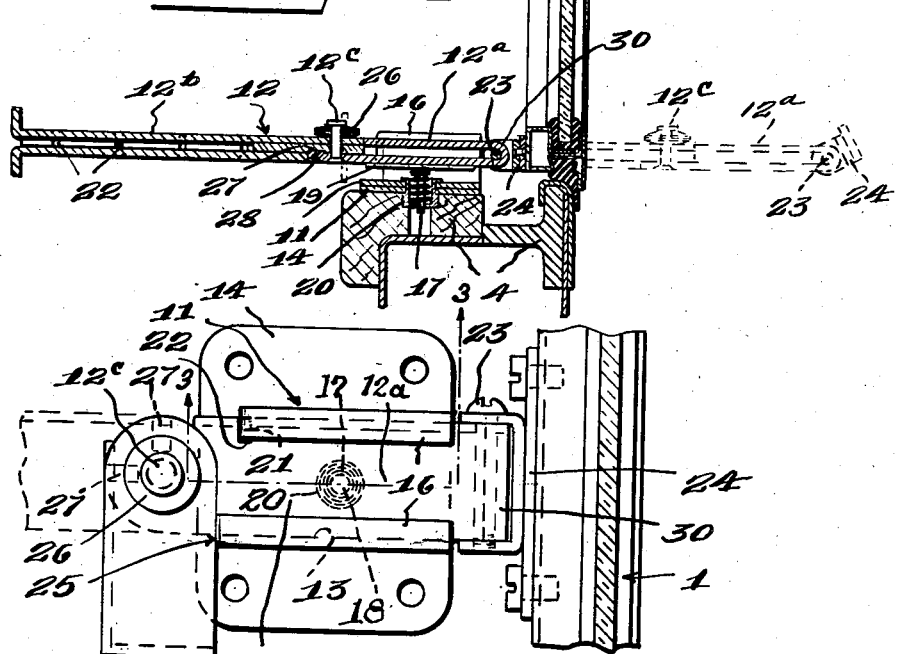
INVENTOR.
John F. Levan
BY Bodell & Thompson
ATTORNEYS.

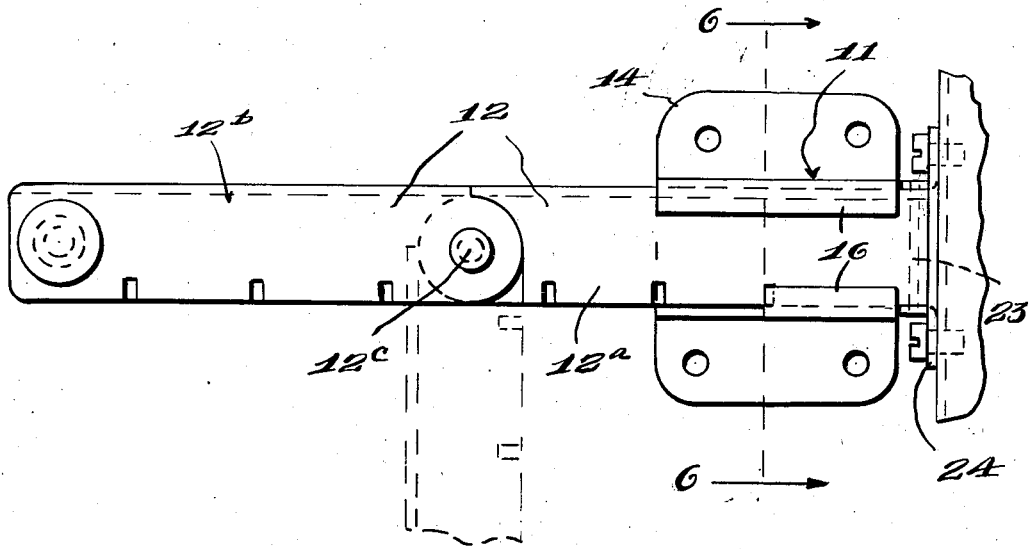
Fig-4-
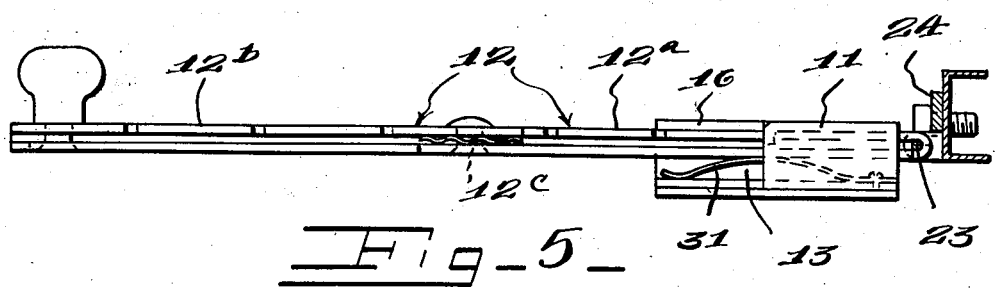
Fig-5-
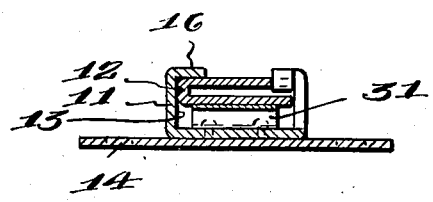
Fig-6-

Dec. 19, 1939.  J. F. LEVAN  2,183,774
OPERATING MECHANISM FOR WINDSHIELDS AND THE LIKE
Filed May 5, 1937  3 Sheets-Sheet 3
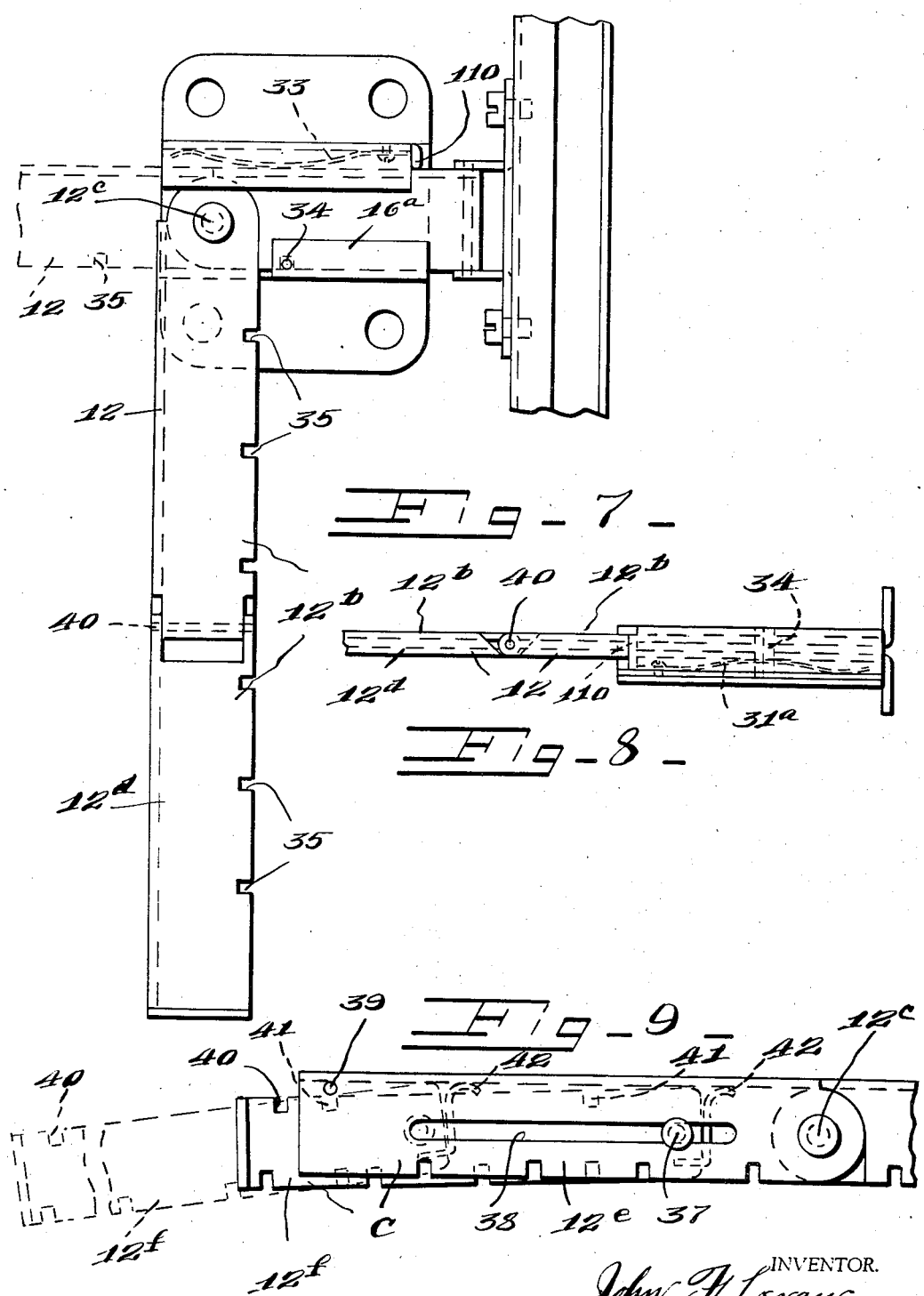
INVENTOR.
John F. Levan
BY Bedell & Thompson
ATTORNEYS Patented Dec. 19, 1939

2,183,774

UNITED STATES PATENT OFFICE 2,183,774

OPERATING MECHANISM FOR WINDSHIELDS AND THE LIKE

John F. Levan, Elkhart, Ind., assignor to Excel Curtain Company, Elkhart, Ind., a corporation of Indiana Application May 5, 1937, Serial No. 140,970

3 Claims. (Cl. 296—84)

This invention relates to operating mechanism for opening and closing windshields and the like which have outward and inward opening and closing movements, as windshields which are hinged along their upper edges, and has for its object an operating mechanism which is simple, economical and durable in construction and easily operated.

It further has for its object an operating mechanism including an operating member which has an endwise sliding movement for tightly opening or closing the windshield, and an angular movement for engaging and disengaging it from locking means, which hold it in its position occupied when the windshield is closed or in various open positions.

Other and more specific objects appear throughout the specification.

The invention consists in the novel features and in the combinations and constructions hereinafter set forth and claimed.

In describing this invention, reference is had to the accompanying drawings, in which like characters designate corresponding parts in all the views.

Figure 1 is a fragmentary longitudinal sectional view of this operating mechanism for windshields, the windshield and the contiguous portion of the windshield frame being also shown.

Figure 2 is a fragmentary plan view of parts seen in Figure 1.

Figure 3 is an enlarged sectional view on the plane of line 3—3, Figure 2, the parts being shown in their positions occupied when the mechanism is operated from the position shown in full lines, Figure 2.

Figures 4 and 5 are plan views of slightly modified forms of the operating mechanism shown in Figures 1 and 2.

Figure 6 is a sectional view on line 6—6, Figure 4.

Figure 7 is a plan view, similar to Figure 2, of a second modification of the invention.

Figure 8 is a fragmentary elevation of parts seen in Figure 7.

Figure 9 is a fragmentary plan view of another form of operating member.

This operating mechanism comprises, generally, a guide fixed to the frame of the body or vehicle provided with the windshield and in juxtaposition to the windshield, an operating member slidable endwise along the guide and connected to the windshield, the operating member having movement at an angle to the endwise movement along the guide, the guide being formed with a shoulder for interlocking with the operating member and holding it from movement and being releasable from the shoulder by the angular movement of the operating member, the angular movement being against the action of a spring.

1 designates the windshield or analogous structure which is hinged at 2 along its upper edge to the frame 3 and around the windshield opening. 4 designates the framing of the vehicle or body along the lower portion of the windshield opening.

The operating mechanism includes a guide 11 fixed to the framing 4 and an operating member 12 slidable along the guide and connected to the windshield. The guide is formed with a passage 13 extending at an angle to the windshield through which passage the member 12 extends, and as here shown, the guide includes a base plate 14 mounted on the framing 4 in the rear of the windshield and a channel formed up of sheet metal with the bottom of the channel overlying the base plate 14 and the open side of the channel upward. The side walls of the channel are provided with inturned lips 16 overhanging the bottom of a box-like channel. The channel member confines the guide passage 13.

The operating member includes two sections 12a and 12b arranged end to end and hinged together at 12c. Usually the operating member is in the general form of a flat strip sliding through the passage 13 underneath the flanges or lips 16. It is mounted to have an angular movement, which is shown as a downward movement in the construction shown in Figures 1, 2 and 3. This angular movement is against the action of a spring 17 shown in Figures 1 and 3, as a coiled spring surrounding a pin 18 extending from a friction plate or shoe 19 and pressing at one end against the lower side of the plate 19, and at its other end against an abutment at the bottom of a thimble 20 secured to the bottom of the channel of the member 11 and to the base plate 14. The thimble extends into a suitable recess in the framing 4.

Preferably, interlocking means is provided between the operating member and the guide 11 to hold the operating member, and hence the windshield closed, and in various open positions. As here shown, one of the lips 16 is formed with an inturned lug or shoulder 21 for entering any one of a plurality of notches 22 formed in the member 12. The spring 17 thrusts upwardly on the member 12 and causes one of the notches to receive the lug when it comes into alinement with the lug. The member 12 is disengaged from the shoulder or lug 21 by a downward movement in the passage 13.

The section 12a is pivotally connected at 23 to a bracket 24 on the lower rail of the windshield and the section 12b is movable about the hinge 12c from a position in alinement with the section 12a into an angular position, where it fulcrums at 25 on the guide member, so that further pressure applied to the section 12b, when in angular position, tightly closes the windshield. One of the notches 22 is located to receive the shoulder 21 when the windshield is clamped tightly in closed position. The hinge 12c is arranged to be located just outside of and to the rear of the passage 13 when the windshield is closed, so that the section 12b, when swung into angular position, may fulcrum on the guide 11. The hinge at 12c includes a suitable spring washer 26 for holding the hinge joint from rattling and also is provided with a cam locking means for holding the sections 12a and 12b in alinement, this locking means being merely a notch at 27 in the section 12b radial with the axis of the hinge and a tooth 28 in the underlying portion of the section 12a. The spring washer 26 causes the tooth and notch to engage with a snap action. The spring yieldingly resists movement of the notch out of engagement with the tooth, when the member is turned into angular position.

The operating member is shown as formed up from sheet metal strips into a flattened U shape in cross section with an eye 39 at one end of the member 12a for receiving the hinge 23. As seen in Figure 2, the notches 22 are preferably arranged at the bottom of the U formation or on the side of the member 12 remote from the fulcrum 25. The hinge 12c is a stop joint and the section 12b can not be moved from an angular position beyond a position where it is alined with the section 12a, as the bottoms of the U formation of said sections come together and prevent further movement.

In operation, the section 12b is first moved from angular position into straight position, and then downward pressure applied against the action of the spring 17 to disengage the operating member from the shoulder or lug 21, and then the pressure applied in an endwise direction to the operating member to open the windshield various distances. When the downward or lateral pressure is discontinued, the operating member 12 will spring upwardly under the influence of the spring 17 so that the shoulder 21 can enter one of the plurality of notches 22. To close the windshield, downward pressure is applied to the operating member to release the same from the shoulder or lug 21 and the operating member pulled inwardly. When the windshield is closed, the hinge 12c of the operating member is just to the rear of the guide 11, and when the section 12b is swung nearly to its full extent in a lateral direction, it will fulcrum at 25, thus exerting further pull on the member 12a to tightly close the windshield and bring one of the notches 22 in line with the shoulder or lug 21.

In Figures 4, 5 and 6, an arcuate leaf spring 31 is provided, this being mounted on the bottom of the channel of the guide member 11 with its apex portion pressing throughout a considerable extent against the upper side of the operating member 12 and performing, to some extent, the function of the shoe 19 (Figure 3).

The springs 17 (Figures 1 and 3) and the spring 31 (Figures 5 and 6) permit the operating member 12 to tilt slightly without rattling in the guide passage 13, as the windshield or the bottom rail thereof swings in an arc during opening and closing.

In Figures 7 and 8, the operating member, instead of having an upward and downward movement has a sidewise angular movement to unlock it from the guide against the action of a spring 33, and one of the overhanging lips 16a of the guide is provided with a shoulder or pin 34 on the under side thereof for coacting with the notches 35 in the operating member 12, the notches being here shown as located on the opposite edge of the operating member from that shown in Figure 3. The lateral movement of the operating member against the action of the spring 33 disengages the notch from the pin and frees the operating member for endwise sliding movement in the guide.

A spring 31a, similar to the spring 31 (Figure 4) is also provided in the guide passages to permit tilting of the operating member without rattling in the guide, during opening and closing of the windshield. During the lateral movement of the operating member against the spring 31, the operating member fulcrums at 110.

In the forms shown in Figures 7 and 8, the section 12b of the operating member is composed of two sections, one of which is mounted to collapse relatively to the other. 12d designates the collapsible section, which is hinged at 40 to the other section, so that when the windshield is closed, the section 12d can be folded over onto the other section, and thus shorten the length of the section 12b, this form being particularly adapted for operating windshields where there is a wide space between the instrument board and the windshield.

In the form shown in Figure 9, one section of the operating member is shown as extensible and contractile and consisting of two telescopic parts, 12e, 12f, one of which is mounted to slide into the other of said parts. The slidable part 12f is provided with a guide pin 37 which lies in a slot 38 formed in the section 12e of the operating member and extending lengthwise thereof. The part 12f is normally held from sliding movement by a shoulder or pin 39 between the double wall formation of the section 12e and arranged to engage notches 40, 41 in the edge of the part 12f. The part 12f has a lateral movement about the axis of the pin 37 to disengage the notch 40 or 41 from the pin 39, this lateral movement being against the action of a returning spring 42.

The parts are normally in the position shown in full lines in Figure 9 with the exception that the member 12f is not swung laterally, as indicated in full lines, but is substantially coincident with the part 12e with the pin 39 interlocked in the notch 40 and with the handle end against the end of the section 12e.

In Figure 9, the section 12e is shown as swung laterally against the spring 42 to disengage the notch 40 from the pin 39 and as pulled out slightly. To operate the windshield, the section 12f is swung laterally; then pulled outwardly to its full extent; and then swung laterally inwardly by the spring 42 to engage notch 41 with the pin 39. These parts are then swung on the axis 12c into alinement with the section 12 of the operating member. Then a downward force is applied to the section 12b to disengage the operating member from the shoulder 21, as in Figure 3, and then a pushing force applied to the extended part 12f to open the windshield. The reverse of these operations closes the windshield and then the section 12f again moved laterally to disengage theno tch 41 from the pin 39 and the part 12f telescoped into the section 12e.

What I claim is:

1. The combination with a windshield having outward and inward opening and closing movements; of an operating mechanism therefor including a guide in the form of a channel formed with a lug extending into the channel, an operating member slidable endwise through the channel, the operating member including two sections arranged end to end, one section being U-shaped in cross section and connected to the windshield, the other section being hinged to said first-mentioned section by a stop joint connection, and notches in both sections for receiving the lug, the sections being provided with means for locking the sections in end to end position.

2. The combination with a windshield having outward and inward opening and closing movements; of an operating mechanism therefor including a guide in the form of a channel formed with a lug extending into the channel, an operating member slidable endwise through the channel, the operating member including two U-shaped sections arranged end to end, one section being connected at one end to the windshield, and hinged by a stop joint at its other end to the other section, and notches in both sections for receiving the lug, the sections being provided with coacting means for holding the sections in end to end position.

3. The combination with a windshield having outward and inward opening and closing movement; of an operating mechanism therefor including a guide in the form of a channel with the open side of the channel upward, inturned lips on the side walls of said channel, one of said lips being formed with a down-turned lug extending into said channel, an operating member slidable endwise through the channel, the operating member including two U-shaped sections, one section being connected at one end to the windshield, means for connecting the other section to the other end of said first-mentioned section to have a limited movement from an angular position to an end to end position, means for locking the sections in end to end position, and notches in the bottom of said U-shaped sections for receiving the lug.

JOHN F. LEVAN.